United States Patent
Dunsmore et al.

(10) Patent No.: US 11,095,534 B1
(45) Date of Patent: Aug. 17, 2021

(54) API-BASED ENDPOINT DISCOVERY OF RESOURCES IN CLOUD EDGE LOCATIONS EMBEDDED IN TELECOMMUNICATIONS NETWORKS

(71) Applicant: Amazon Technologies, Inc., Seattle, WA (US)

(72) Inventors: Devlin Roarke Dunsmore, Bothell, WA (US); Colm Maccarthaigh, Seattle, WA (US); Ishwardutt Parulkar, San Francisco, CA (US); Dougal Stuart Ballantyne, Seattle, WA (US); Diwakar Gupta, Seattle, WA (US); Upendra Bhalchandra Shevade, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/699,336

(22) Filed: Nov. 29, 2019

(51) Int. Cl.
  *G06F 15/173* (2006.01)
  *H04L 12/24* (2006.01)
  *H04L 29/08* (2006.01)

(52) U.S. Cl.
  CPC ...... *H04L 41/5058* (2013.01); *H04L 41/0286* (2013.01); *H04L 41/12* (2013.01); *H04L 67/16* (2013.01)

(58) Field of Classification Search
  CPC . H04L 41/5058; H04L 41/0286; H04L 41/12; H04L 67/16; H04L 61/1511; H04L 67/10
  USPC ........................................................ 709/223
  See application file for complete search history.

(56) References Cited

U.S. PATENT DOCUMENTS

| | | | |
|---|---|---|---|
| 7,725,602 B2 | 5/2010 | Liu et al. | |
| 8,117,296 B2 | 2/2012 | Liu et al. | |
| 8,423,667 B2 * | 4/2013 | Richardson | H04L 69/40 709/242 |
| 8,463,877 B1 | 6/2013 | Richardson et al. | |
| 8,583,776 B2 | 11/2013 | Richardson et al. | |
| 8,601,090 B1 * | 12/2013 | Richardson | H04L 67/16 709/217 |
| 2006/0259578 A1 * | 11/2006 | Fritsch | H04L 41/5058 709/217 |

(Continued)

OTHER PUBLICATIONS

Notice of Allowance, U.S. Appl. No. 16/699,334, dated Sep. 9, 2020, 16 pages.

(Continued)

*Primary Examiner* — Hee Soo Kim
(74) *Attorney, Agent, or Firm* — Nicholson De Vos Webster & Elliott, LLP

(57) ABSTRACT

Techniques for API-based endpoint discovery involving provider substrate extension resources are described. A discovery coordinator service located within the provider network can identify one or more endpoints from a set of potentially distributed endpoints for a client to utilize, where endpoints may be located within provider substrate extensions of the provider network. The discovery coordinator service can utilize location values of the client provided via an API request, such as its network address or geographic coordinates, to identify a nearby resource that may be most optimal for the client to use via providing minimal latency of access.

20 Claims, 14 Drawing Sheets

(56) References Cited

U.S. PATENT DOCUMENTS

| | | | | |
|---|---|---|---|---|
| 2010/0309784 | A1* | 12/2010 | Mihaly | H04L 29/12066 |
| | | | | 370/230 |
| 2014/0059226 | A1* | 2/2014 | Messerli | H04L 47/783 |
| | | | | 709/226 |
| 2014/0149494 | A1* | 5/2014 | Markley | H04W 4/60 |
| | | | | 709/203 |
| 2014/0229945 | A1 | 8/2014 | Barkai et al. | |
| 2015/0207683 | A1* | 7/2015 | Adogla | H04L 41/0893 |
| | | | | 709/223 |
| 2016/0092344 | A1* | 3/2016 | Bally | G06F 11/3684 |
| | | | | 717/124 |
| 2016/0255042 | A1 | 9/2016 | Newton | |
| 2017/0195183 | A1* | 7/2017 | Gershaft | H04L 41/06 |
| 2018/0219749 | A1* | 8/2018 | Bugenhagen | H04L 41/14 |
| 2020/0159591 | A1* | 5/2020 | Rudolph | H04L 67/2804 |
| 2020/0159592 | A1* | 5/2020 | Hansmann | H04L 67/16 |

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.

\* cited by examiner

```
                                                              1000
                                                               ↙

┌─────────────────────────────────────────────────────────────────┐
│  RECEIVE, AT A COORDINATOR SERVICE WITHIN A CLOUD PROVIDER       │
│  NETWORK, A FIRST APPLICATION PROGRAMMING INTERFACE (API)        │
│  REQUEST TO DISCOVER ONE OR MORE ENDPOINTS ASSOCIATED WITH       │
│  AN APPLICATION, THE FIRST API REQUEST INCLUDING AN IDENTIFIER   │
│  OF THE APPLICATION AND ONE OR MORE LOCATION VALUES ASSOCIATED   │
│  WITH A CLIENT DEVICE SEEKING TO INTERACT WITH THE APPLICATION   │
│  1005                                                            │
│  ┌───────────────────────────────────────────────────────────┐  │
│  │ THE FIRST API REQUEST IS ORIGINATED BY A SERVER APPLICATION│ │
│  │ EXECUTING WITHIN THE CLOUD PROVIDER NETWORK  1010          │ │
│  └───────────────────────────────────────────────────────────┘  │
│  ┌───────────────────────────────────────────────────────────┐  │
│  │ THE FIRST API REQUEST IS ORIGINATED BY THE CLIENT DEVICE   │ │
│  │ THAT IS OUTSIDE THE CLOUD PROVIDER NETWORK  1015           │ │
│  └───────────────────────────────────────────────────────────┘  │
│  ┌───────────────────────────────────────────────────────────┐  │
│  │ THE ONE OR MORE LOCATION VALUES INCLUDE A NETWORK ADDRESS  │ │
│  │ ASSOCIATED WITH THE CLIENT DEVICE  1020                    │ │
│  └───────────────────────────────────────────────────────────┘  │
│  ┌───────────────────────────────────────────────────────────┐  │
│  │ THE ONE OR MORE LOCATION VALUES INCLUDE A GEOGRAPHIC       │ │
│  │ COORDINATE (E.G., LATITUDE, LONGITUDE) ASSOCIATED WITH     │ │
│  │ THE CLIENT DEVICE  1025                                    │ │
│  └───────────────────────────────────────────────────────────┘  │
└─────────────────────────────────────────────────────────────────┘
                              │
                              ▼
┌─────────────────────────────────────────────────────────────────┐
│  SELECT, BY THE COORDINATOR SERVICE BASED AT LEAST IN PART ON    │
│  THE APPLICATION IDENTIFIER AND THE ONE OR MORE LOCATION VALUES, │
│  ONE OR MORE ENDPOINTS THAT ARE ASSOCIATED WITH THE              │
│  APPLICATION, WHEREIN AT LEAST ONE OF THE ENDPOINTS IS           │
│  ASSOCIATED WITH A COMPUTE INSTANCE EXECUTED WITHIN A PROVIDER   │
│  SUBSTRATE EXTENSION OF THE CLOUD PROVIDER NETWORK  1030         │
│  ┌───────────────────────────────────────────────────────────┐  │
│  │ DETERMINE A LOCATION OF THE CLIENT DEVICE BASED ON THE     │ │
│  │ ONE OR MORE LOCATION VALUES  1035                          │ │
│  └───────────────────────────────────────────────────────────┘  │
│  ┌───────────────────────────────────────────────────────────┐  │
│  │ IDENTIFY ENDPOINTS ASSOCIATED WITH THE APPLICATION  1040   │ │
│  └───────────────────────────────────────────────────────────┘  │
│  ┌───────────────────────────────────────────────────────────┐  │
│  │ SELECT ONE OR MORE ENDPOINTS BASED ON AN ESTIMATED LATENCY │ │
│  │ BETWEEN THE ENDPOINTS AND THE CLIENT DEVICE  1045          │ │
│  └───────────────────────────────────────────────────────────┘  │
└─────────────────────────────────────────────────────────────────┘
                              │
                              ▼
┌─────────────────────────────────────────────────────────────────┐
│  TRANSMIT, BY THE COORDINATOR SERVICE, A RESPONSE MESSAGE THAT   │
│  IDENTIFIES THE ONE OR MORE ENDPOINTS  1050                      │
└─────────────────────────────────────────────────────────────────┘
```

RECEIVE, AT A COORDINATOR SERVICE WITHIN A CLOUD PROVIDER NETWORK, A FIRST APPLICATION PROGRAMMING INTERFACE (API) REQUEST TO DISCOVER ONE OR MORE ENDPOINTS ASSOCIATED WITH AN APPLICATION, THE FIRST API REQUEST INCLUDING AN IDENTIFIER OF THE APPLICATION AND ONE OR MORE LOCATION VALUES ASSOCIATED WITH A CLIENT DEVICE SEEKING TO INTERACT WITH THE APPLICATION 1005

THE FIRST API REQUEST IS ORIGINATED BY A SERVER APPLICATION EXECUTING WITHIN THE CLOUD PROVIDER NETWORK 1010

THE FIRST API REQUEST IS ORIGINATED BY THE CLIENT DEVICE THAT IS OUTSIDE THE CLOUD PROVIDER NETWORK 1015

THE ONE OR MORE LOCATION VALUES INCLUDE A NETWORK ADDRESS ASSOCIATED WITH THE CLIENT DEVICE 1020

THE ONE OR MORE LOCATION VALUES INCLUDE A GEOGRAPHIC COORDINATE (E.G., LATITUDE, LONGITUDE) ASSOCIATED WITH THE CLIENT DEVICE 1025

SELECT, BASED AT LEAST IN PART ON THE APPLICATION IDENTIFIER AND A LOAD VALUE OF EACH OF A PLURALITY OF COMPUTE INSTANCES, ONE OR MORE ENDPOINTS FROM A PLURALITY OF ENDPOINTS THAT ARE ASSOCIATED WITH THE APPLICATION, WHEREIN AT LEAST A FIRST OF THE PLURALITY OF ENDPOINTS IS ASSOCIATED WITH A FIRST COMPUTE INSTANCE OF THE PLURALITY OF COMPUTE INSTANCES THAT IS EXECUTED WITHIN A FIRST PROVIDER SUBSTRATE EXTENSION OF THE PROVIDER NETWORK 1105

IDENTIFY A PLURALITY OF ENDPOINTS ASSOCIATED WITH THE APPLICATION 1040

DETERMINE, FOR EACH OF A PLURALITY OF COMPUTE INSTANCES ASSOCIATED WITH THE PLURALITY OF ENDPOINTS, A NUMBER OF ACTIVE LEASES OBTAINED FOR THE COMPUTE INSTANCE, WHEREIN THE LOAD VALUE OF EACH COMPUTE INSTANCE COMPRISES THE NUMBER OF ACTIVE LEASES OR IS BASED AT LEAST IN PART ON THE NUMBER OF ACTIVE LEASES 1110

SELECT ONE OR MORE ENDPOINTS BASED AT LEAST IN PART THE NUMBERS OF ACTIVE LEASES ASSOCIATED WITH THE ENDPOINTS 1115

TRANSMIT, BY THE COORDINATOR SERVICE, A RESPONSE MESSAGE THAT IDENTIFIES THE ONE OR MORE ENDPOINTS 1050

*FIG. 11*

API-BASED ENDPOINT DISCOVERY OF RESOURCES IN CLOUD EDGE LOCATIONS EMBEDDED IN TELECOMMUNICATIONS NETWORKS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the following drawings.

FIG. 10 is a flow diagram illustrating operations of a method for endpoint discovery involving provider substrate extension resources using an API-based approach according to some embodiments.

FIG. 11 is a flow diagram illustrating operations of a method for endpoint discovery with remote load balancing involving provider substrate extension resources using an API-based approach according to some embodiments.

DETAILED DESCRIPTION

Figure 1:
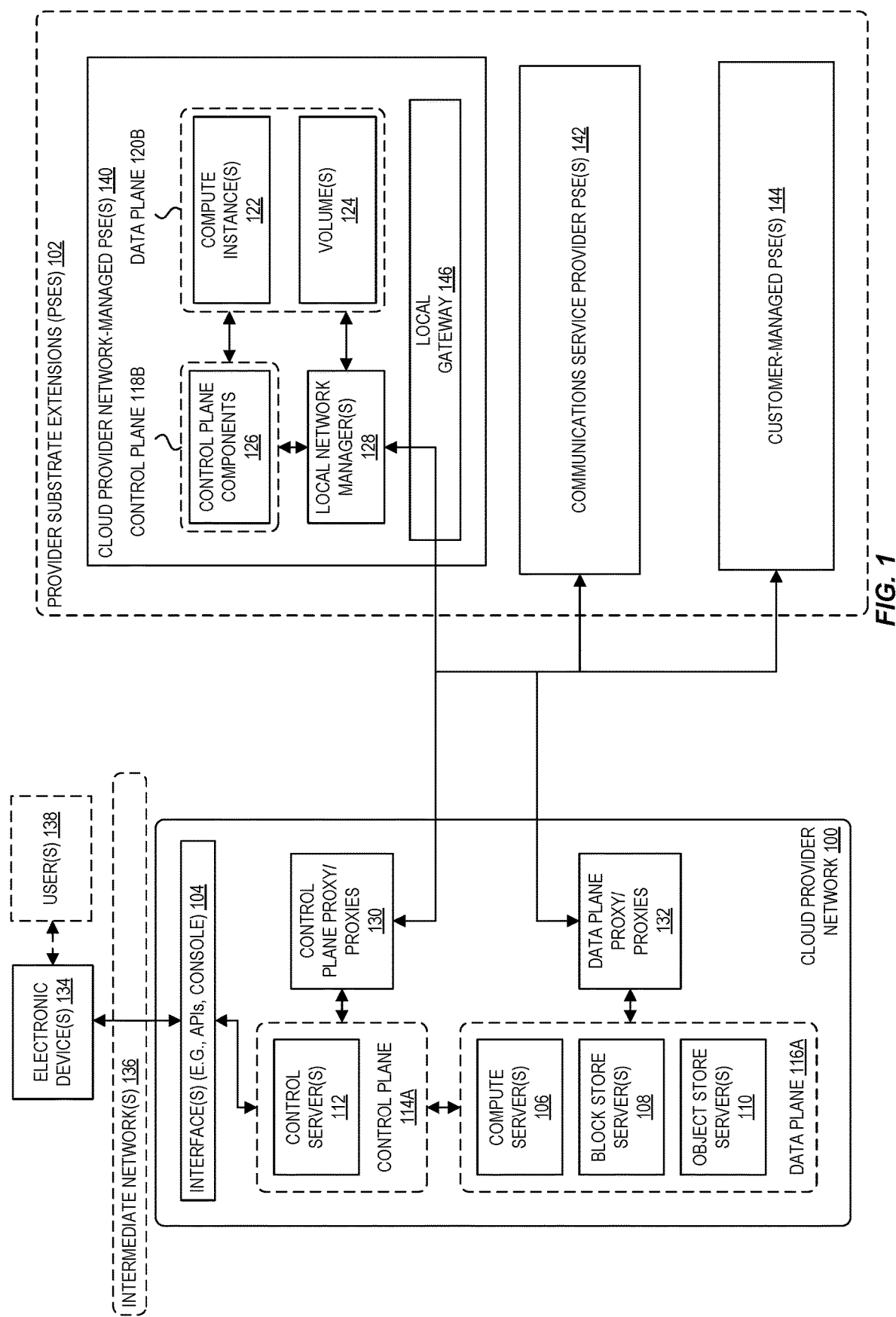
FIG. 1 illustrates an exemplary system including a cloud provider network and further including various provider substrate extensions according to some embodiments.

The present disclosure relates to methods, apparatus, systems, and non-transitory computer-readable storage media for endpoint discovery and load balancing for cloud service provider substrate extension resources. A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a provider substrate extension (or "PSE")—can be provisioned within a network that is independent from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

In some embodiments, another example of a provider substrate extension is a network deployed at a communications service provider. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiberoptic, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including provider network substrate extensions at which computing resources can be deployed by customers of a provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object storage servers 110 include one or more servers on which data is stored as objects within resources referred to as buckets, and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

The migration manager may have a centralized coordination component that runs in region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
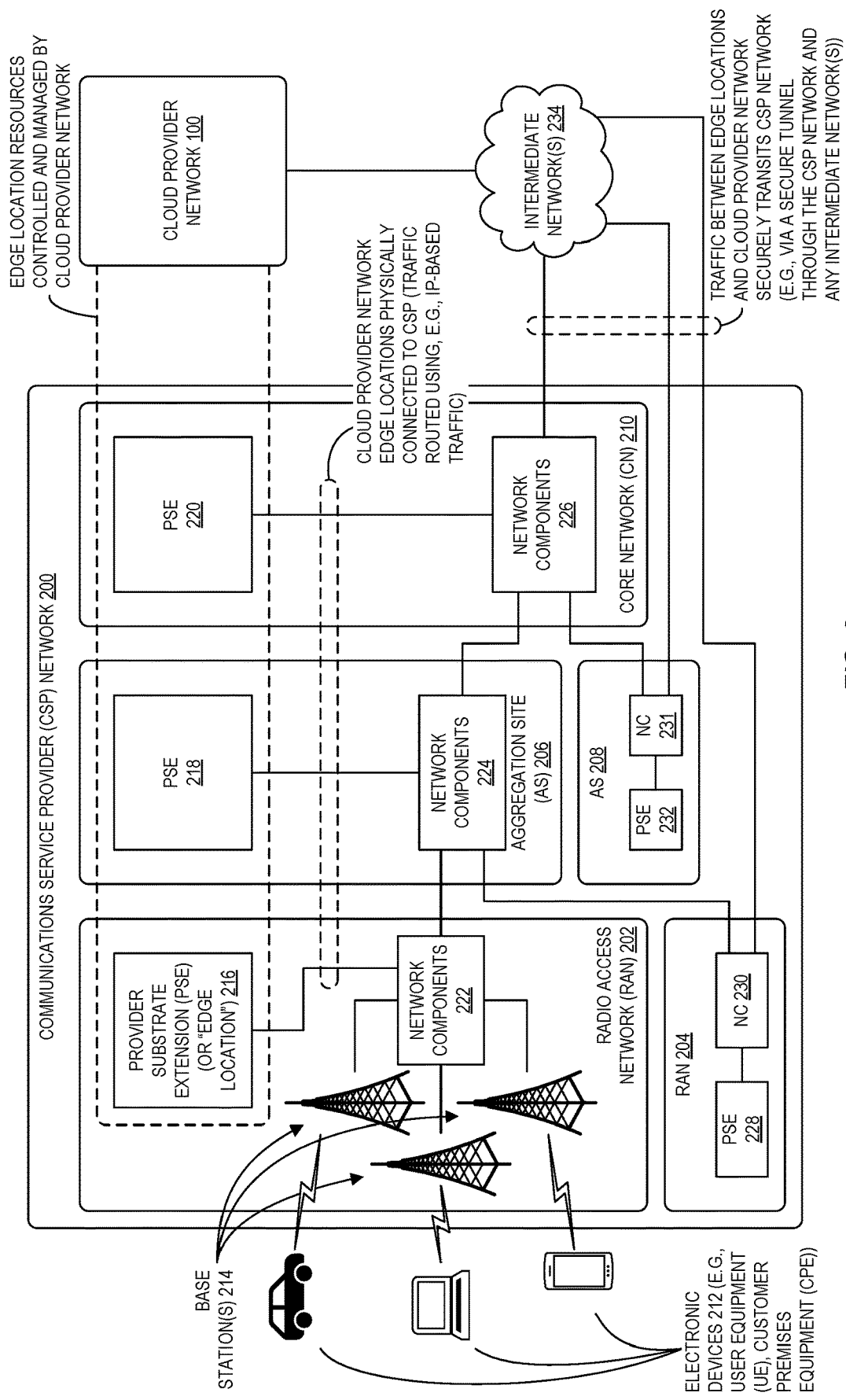
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
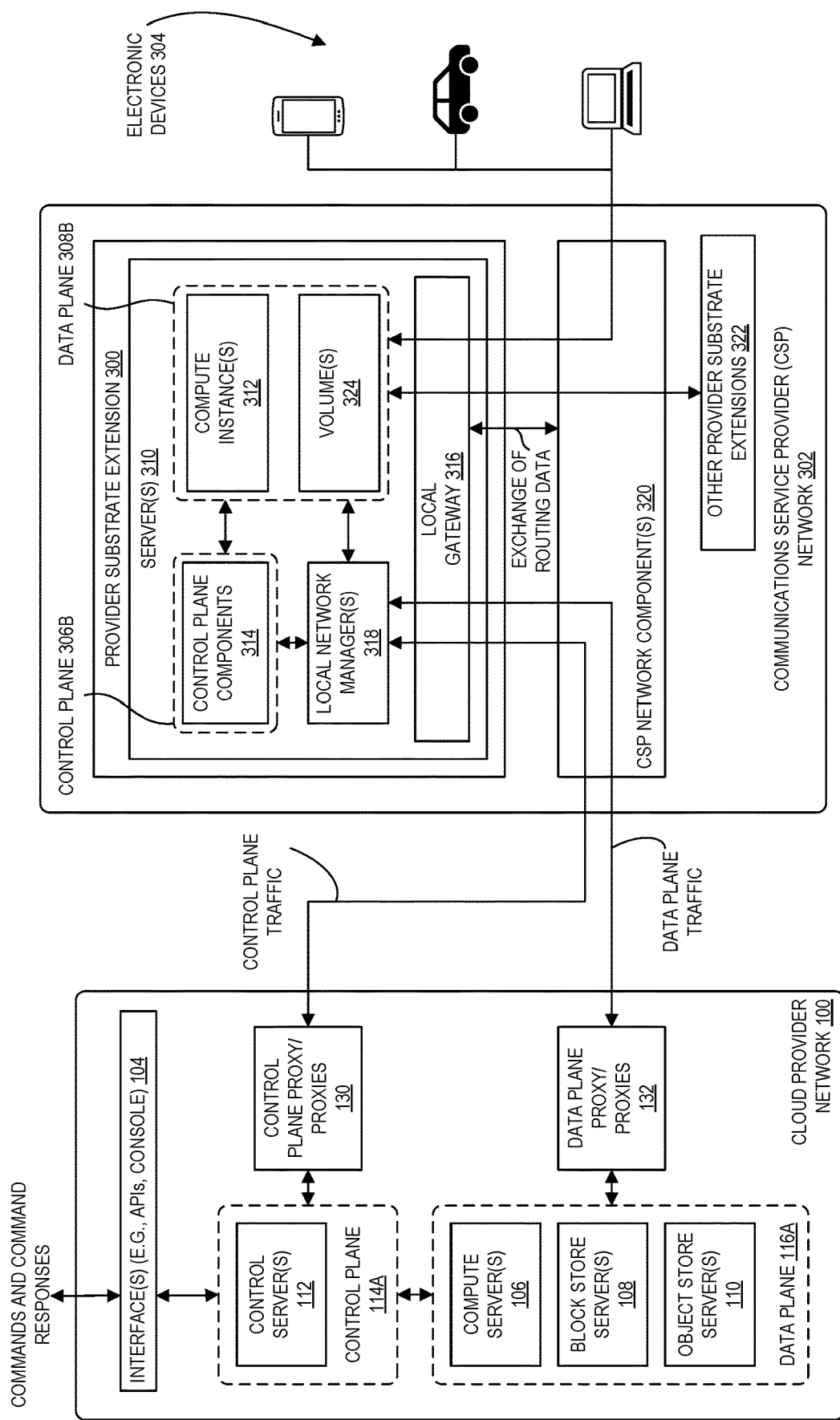
FIG. 3 illustrates in greater detail exemplary components of and connectivity between a provider substrate extension and a cloud provider network according to some embodiments.

FIG. 3 illustrates in greater detail exemplary components of and connectivity between a provider substrate extension associated with a communications service provider and a cloud provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 200 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 200 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide Internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
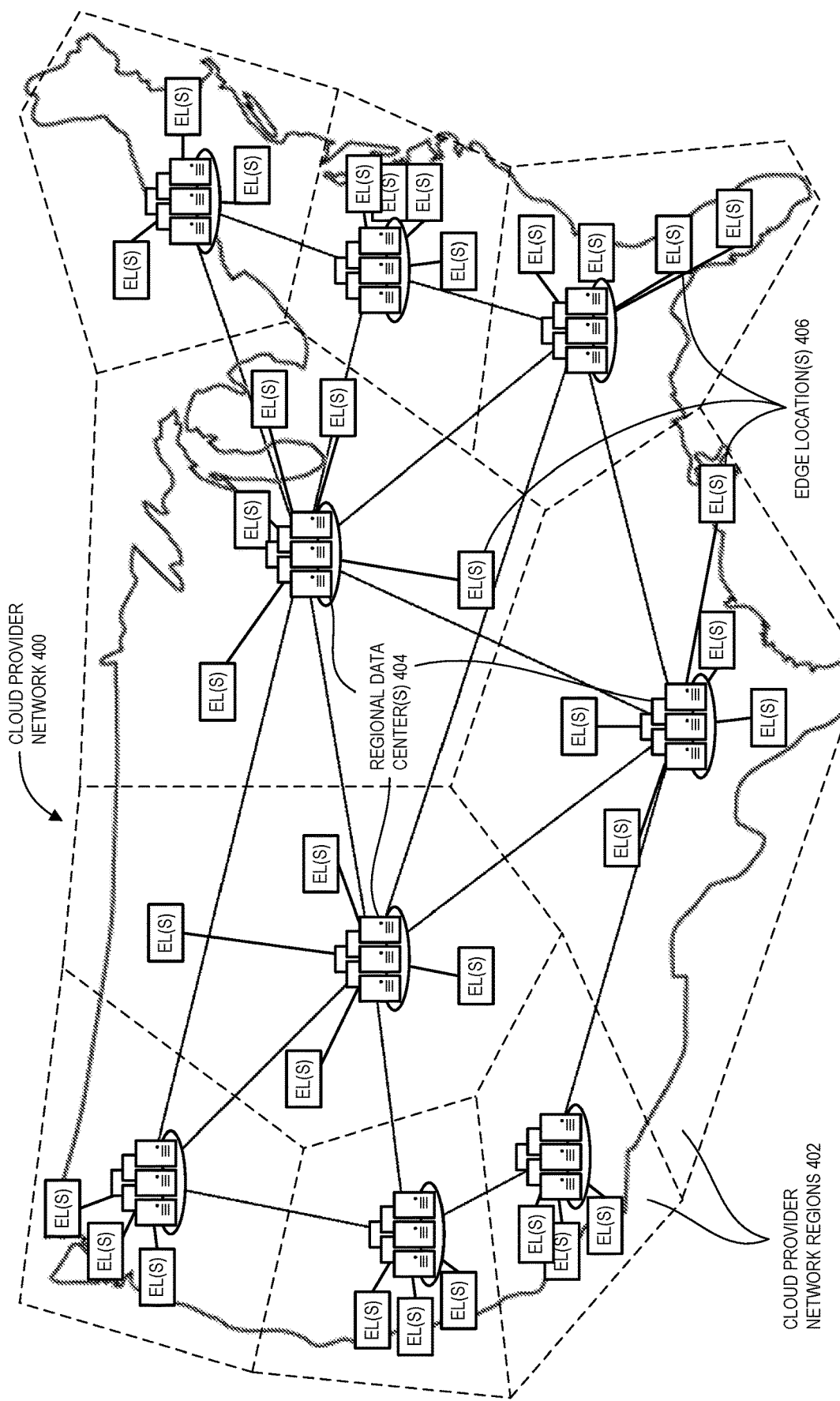
FIG. 4 illustrates an exemplary cloud provider network including provider substrate extensions (or "edge locations") according to some embodiments.

FIG. 4 illustrates an exemplary cloud provider network including provider substrate extension locations (or "edge locations") according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

As indicated herein, a cloud provider network can be formed as a number of regions, where a region may be a geographical area in which the cloud provider clusters data centers. Each region can include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

One benefit provided by the utilization of PSEs with backing cloud provider networks is that computing resources implemented within PSEs are "closer" to end users, and thus such architectures provide extremely low-latency interactions preferred by modern computing applications, such as in video gaming, communications, etc. Thus, systems employing PSEs should satisfy customer use cases requiring low client latency and should allow users a way to launch compute instances (and other computing resources) around geographic areas such that it guarantees reliable latencies for all clients in the coverage area. Moreover, such systems should provide a way for clients—e.g., mobile clients or wired clients—to be able to easily "discover" which computing instance(s) implementing an application they should connect to, given their current location.

By way of example, it may be the case that a customer of a cloud provider network has deployed compute instances (each implementing an application) in multiple locations, such as within one or multiple PSEs, within the cloud provider network itself, etc. In this scenario, a client device seeking to interact with the application—and especially one that is mobile and may be in different locations at different times—needs to be able to quickly and easily identify which instance(s) are "best" for it to connect to, which may require knowledge of what instances currently exist, whether the client can actually connect to these instances, what the communications latency is between the client and these instances, how loaded/consumed these instances are, etc. As the numbers, locations, and utilization of such multiple instances may change over time, this discovery problem is an extremely difficult task for application developers to address.

However, embodiments disclosed herein provide techniques for enabling optimized endpoint discovery involving PSE resources. In various embodiments, API-based techniques and/or DNS-based techniques can be utilized to allow clients to identify and connect to endpoints with preferred characteristics (e.g., extremely low latency to the client device and/or highly available) that may be, for example, within a PSE attached to a communications provider network.

Figure 5:
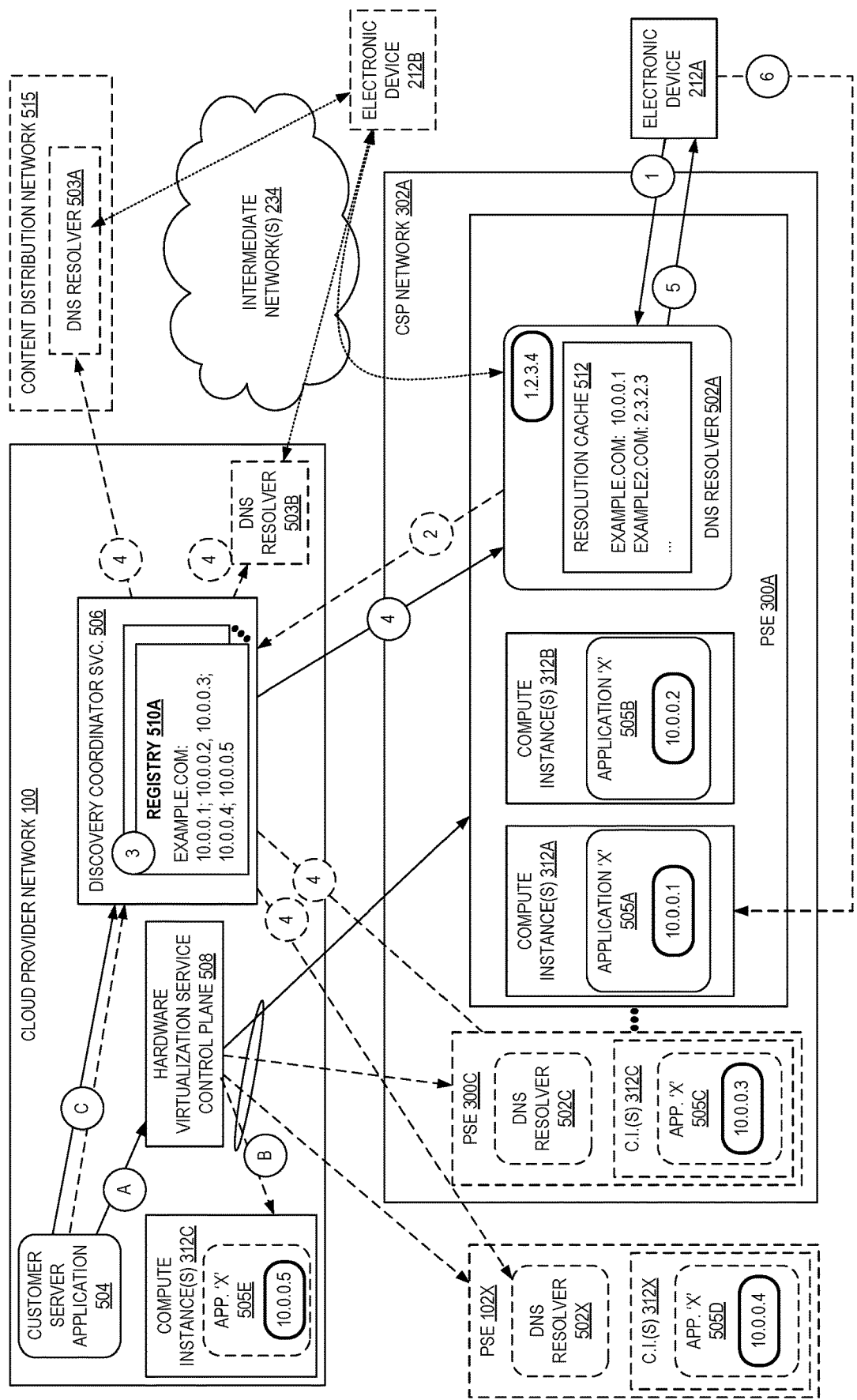
FIG. 5 illustrates a DNS-based approach for endpoint discovery involving provider substrate extension resources according to some embodiments.

For example, FIG. 5 illustrates a DNS-based approach for endpoint discovery involving provider substrate extension resources according to some embodiments. As illustrated herein, an electronic device 212A (e.g., a mobile device such as a smartphone, vehicle, smart watch, etc.) may utilize a DNS resolution procedure, via a DNS resolver 502 within a PSE 300, to identify a network address (e.g., an IPv4 network address) of a low-latency compute instance 312 that the electronic device 212A can connect to in order to utilize a desired application 505.

To begin, a customer of a cloud provider network (e.g., cloud provider network 100) may deploy instances of a software application 505 (e.g., web servers, application servers, database servers, etc.) in one or more locations. For example, a customer's "backend" server application 504 (or, another client application, such as one executed outside the provider network 100 by another electronic device of the customer) may issue one or more commands (e.g., "run instance" commands) as shown at circle (A) to a hardware virtualization service control plane 508 to launch a number of compute instances 312. The command(s) may identify particular locations in which to launch the compute instance(s) 312, e.g., within a particular region or AZ of the cloud provider network 100 as compute instance(s) 312Z, within one or more PSEs 300A-300C attached to a telecommunications provider network 302A as compute instance(s) 312A-312B, within another type of PSE 102X, etc. Each compute instance 312 may be instantiated by the hardware virtualization service control plane 508 may issuing commands necessary to launch the necessary compute instances at circle (B), e.g., via use of a particular machine image that instantiates an instance of an application 505, or by launching a compute instance that is thereafter configured by the customer to execute the application 505. As part of the deployment of instances, the compute instances 312 may be assigned or configured to utilize particular network addresses, which may include private, non-routable network addresses and public, routable network addresses. In this example, a public network address (that can be globally reached from outside of the cloud provider network 100 and/or CSP network 302A) is illustrated in association with each application—application 505A with 10.0.0.1 and application 505B with 10.0.0.2, which are both within a same PSE 300A, application 505C with 10.0.0.3 that may be in another PSE 300C, application 505D with 10.0.0.4 that may be within another type of PSE 102X, and/or application 505E with 10.0.0.5.

The customer server application 504 (or again, another application executed on behalf of a customer) can then register, via one or more API requests to a discovery coordinator service 506 service, the network addresses. For example, the customer server application 504 may send a request to create a registry 510A for the customer's application, which is to be associated with a domain (e.g., example.com), and may also send one or more requests to associate the network addresses of the application—and/or identifiers of the compute instances utilizing those network addresses (either of which may be referred to as endpoints)—with the domain. These items of information, in different embodiments, can be sent in various combinations and using various numbers of API requests, e.g., via a single API request, via a first "create registry" API request and then one or more "associate endpoint" API requests, etc.

Thereafter, a user's electronic device 212A executing a client application (e.g., a web browser, a special-purpose application, an operating system, etc.) may seek to connect to the application and thus attempt to resolve a domain associated therewith to identify an endpoint. For the sake of this example, we assume the electronic device 212A desires to resolve the domain "example.com" to a network address (e.g., a routable IP address) endpoint through use of a DNS resolver at a configured network address—e.g., 1.2.3.4.

In cases where the electronic device 212A is connected via a cellular connection through a telecommunications service provider network 302A, at circle (1) the DNS request, identifying "example.com", is sent through the CSP network 302A, which has knowledge of a route to that destination (e.g., due to an advertisement of a route to that address at the border of the PSE 300A and the CSP network 302A), which may route the request into the PSE 300A accordingly. In some embodiments, multiple DNS resolvers 502 used in the system may utilize a same network address (e.g., 1.2.3.4) using an anycast routing scheme.

Thereafter, the request arrives at the DNS resolver 502A, which may determine whether it can resolve the domain "example.com" using a resolution cache 512. In the case in which no such entry exists—and thus, the DNS resolver 502A cannot immediately resolve the domain (e.g., via its resolution cache 512)—at optional circle (2) the DNS resolver 502A may issue another resolution request (identifying the domain of interest—here, "example.com") to a discovery coordinator service 506 executed within the cloud provider network 100.

The discovery coordinator service 506 may use the identified domain from the request (example.com) to identify, at circle (3), an associated registry 510A and a set of "candidate" network addresses registered in association with the domain.

In some embodiments, the discovery coordinator service 506 can utilize other information from this request—e.g., the source network address of the DNS resolver 502A that originated the request, a resource identifier assigned to the DNS resolver 502A by the provider network 100, etc.—to determine a location of the DNS resolver 502A/PSE 300A. For example, upon deploying the PSE 300A, the location (e.g., a GPS coordinate, latitude and longitude, assigned unique location identifier that is within the context of the provider network, etc.) of the PSE 300A can be provided to the discovery coordinator service 506 together with an identifier of the PSE 300A or DNS resolver (e.g., its IP address, or other unique resource identifier issued by the cloud provider network 100).

Additionally, or alternatively, the request may carry other information, such a network address (e.g., IP address) of the client electronic device 212A, a client network (or subnet) associated with the client electronic device 212A (e.g., a /24 block), etc., which the discovery coordinator service 506 may similarly use to determine a location associated with the client electronic device 212A, e.g., by performing a lookup or query to a database, service, etc., that can identify a location. In some cases, this client information may be passed within an extended DNS type message, such as an Extension mechanisms for DNS (EDNS) message. The translation of a client's network address or subnet/network into a location may include, for example, obtaining mapping information from a corresponding communications service provider indicating where particular IP addresses/networks are currently located (e.g., via identifiers of which cells, base stations, cities, etc. these addresses are utilized at). This information may be pushed by the communications service provider networks to the discovery coordinator service 506, the discovery coordinator service 506 may "pull" this information (e.g., on a scheduled basis, or on-demand) from the communications service provider networks, etc. In some embodiments, this information may also include one or more identifiers of PSEs 300 that are nearby the associated client, as the communications service provider may have explicit knowledge of the locations of various PSEs 300 within its network, the location of the client, and may thus identify one or more PSEs that may be closest to the client from its perspective. Thus, as described later herein, the discovery coordinator service 506 may select a compute instance within one of these identified PSEs, or potentially another PSE (that may be, for example, not associated with the communications service provider), as the optimal location.

The discovery coordinator service 506 can utilize the determined location associated with the DNS resolver 502A/PSE 300A as a proxy for the approximate location of the electronic device 212A to determine which of the candidate network addresses (i.e., application instances 505/compute instances 312) are geographically closest to the client device 212A. For example, the discovery coordinator service 506 may utilize logic to identify distances between the location associated with the DNS resolver 502A and ones of the associated network addresses in the registry 510A, which may utilize geographic distances (e.g., distances between GPS coordinate pairs), statically defined distances, determined distances (e.g., based on measuring round-trip-times (RTTs) between PSE 300 sites, compute instances 312, etc.), or similar according to a technique known to those of skill in the art.

In some embodiments, the discovery coordinator service 506 may select a single "closest" endpoint network address/computing instance according to these distances, which in this example could be compute instance 312A utilizing the network address 10.0.0.1 that in this case is within a same PSE 300A as the requesting DNS resolver 502A, and return this single network address in a DNS response transmitted at circle (4) back to the DNS resolver 502A, which may update its resolution cache 512 (to avoid needing to contact the discovery coordinator service 506 for a mapping in the future) and send a DNS response at circle (5) back to the electronic device 212A. Alternatively, in some embodiments the discovery coordinator service 506 may instead provide back a preference vector including a list of network addresses to be used, which may be unordered (e.g., include two network addresses of 10.0.0.1 and 10.0.0.2 that are both the "closest") or ordered (e.g., include two or more network addresses, where earlier network addresses are "closer" and thus utilized first). In such cases, the DNS resolver 502A may store multiple mappings for a domain in its resolution cache 512, and may select between these multiple network addresses according to some selection scheme, e.g., random, round-robin, weighted round robin, etc.

Thereafter, as shown at optional circle (6), the electronic device 212A may utilize the application 505A via sending network traffic to the resolved destination address that was returned at circle (5).

In some embodiments, the discovery coordinator service 506 may also proactively populate DNS resolvers 502 present at various locations—e.g., within PSE 300A-300C/ 102X locations as DNS resolvers 502A-502C/502X, within the provider network 100 as DNS resolver 503B, outside the provider network 100 such as within a content distribution network 515 (CDN) or other network as DNS resolver 503A, etc. In this manner, the discovery coordinator service 506 can eliminate or reduce the need for individual DNS resolvers 502/503 to synchronously involve the discovery coordinator service 506 to resolve a domain for an active request, improving the speed of service. In some embodiments, the discovery coordinator service 506 can also configure various DNS resolvers 502A to resolve a same domain to different endpoints (each being closest to the respective resolver).

In some embodiments, electronic devices 212B using another network 234 for connectivity may likewise utilize this resolution technique, and may connect to a DNS resolver 502/503 within a CDN 515, within the provider network 100, or in a PSE 300A, and the resolver may return a network address closest to the electronic device 212B. In some embodiments, for determining which application endpoint is closest to such an electronic device 212B connecting through another network, the network address of the electronic device 212B itself may be used (e.g., in place of a network address or identifier of the DNS resolver) as it may be used to determine a rough location of the device.

Figure 6:
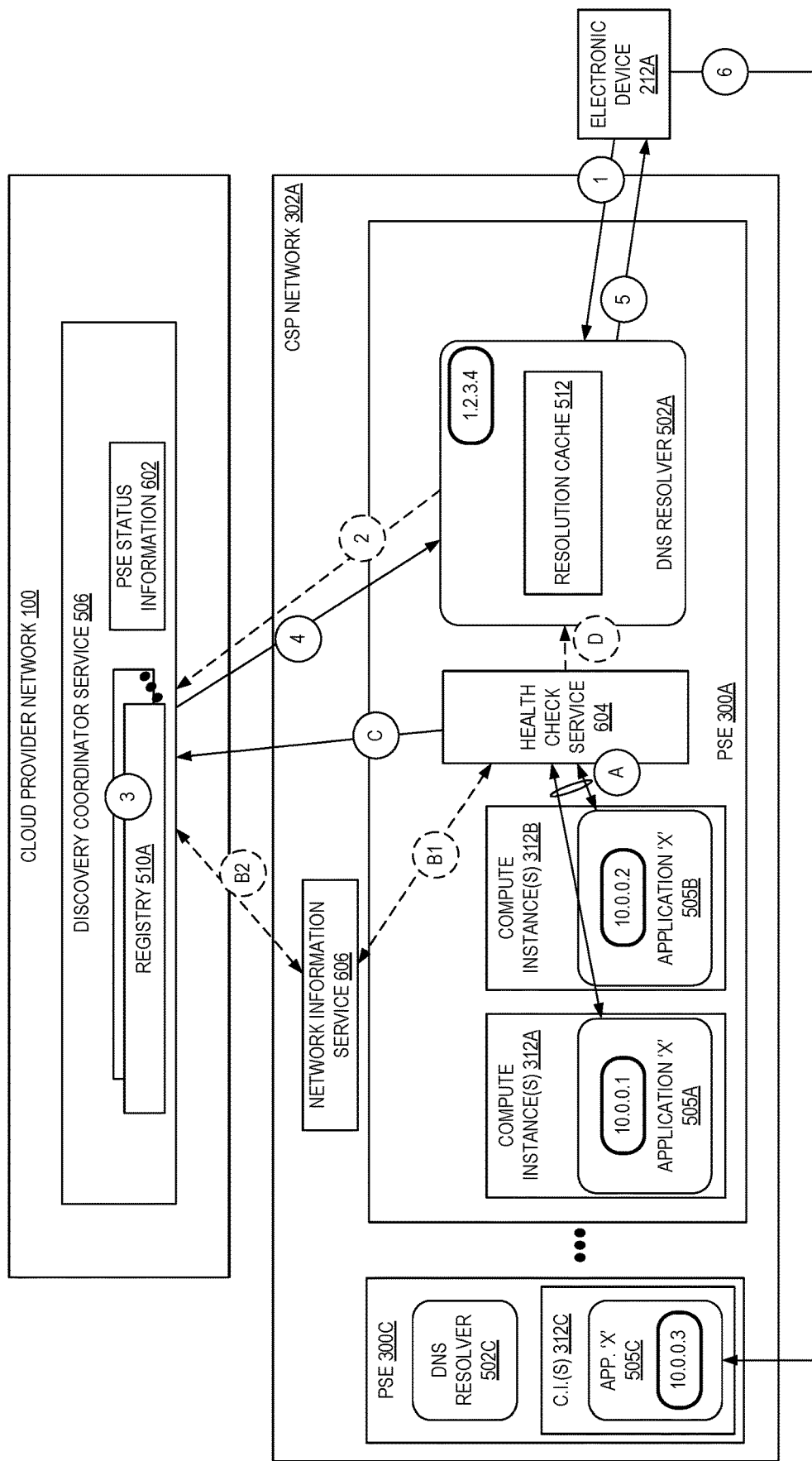
FIG. 6 illustrates a DNS-based approach utilizing network and endpoint health checking for endpoint discovery involving provider substrate extension resources according to some embodiments.

In some embodiments, in addition to selecting an application network address based on distance, the discovery coordinator service 506 can also utilize various health/status information to further fine-tune the selection process. For example, FIG. 6 illustrates a DNS-based approach utilizing network and endpoint health checking for endpoint discovery involving provider substrate extension resources according to some embodiments. In this example, the operations with regard to circles (1)-(5) remain largely the same as in FIG. 5; however, the endpoint selection operations of circle (3) can be modified to take into account factors in addition to distance, such as the health of involved applications 505 and/or the status of the CSP network 302A or its visibility into the operation of the PSE 300A.

For example, in some embodiments a health check service 604 is deployed within the PSE 300A that can monitor the health of the applications 505 and/or the health or status of the PSE 300A itself. For example, in some embodiments the health check service 604 may monitor the health of the compute instances 312A-312B by "pinging" each instance (e.g., sending ICMP echo requests, and receiving replies thereto) periodically or according to a schedule at circle (A) to ensure that the instances remain active and responsive.

Status information generated using the ping data, such as the responsiveness or non-responsiveness of an instance, the time to reply or statistics based thereupon, etc., may be periodically sent to the discovery coordinator service 506 at circle (C) and optionally stored as PSE status information 602. However, in some embodiments, the health check service 604 may instead send back a status update message at circle (C) upon detecting the non-responsiveness of an instance (when it was previously responsive, or otherwise expected to be responsive) or the responsiveness of an instance (which it was previously non-responsive or otherwise expected to be non-responsive). In some cases, at optional circle (D) the health check service 604 may also send a notification message to the DNS resolver 502A to indicate an unexpected non-responsiveness or responsiveness of a particular endpoint, which may allow the DNS resolver 502A to switch to resolving to a backup endpoint or go back to using a primary, previously-failed endpoint, which can be especially beneficial if the PSE 300A is unable to communicate with the discovery coordinator service 506 for some reason.

In some embodiments, the health check service 604 may periodically communicate with a network information service 606 API provided by the CSP network 302A, which may provide information on the operation of the PSE 300A (or the CSP network 302A itself) that may also be reported to the discovery coordinator service 506 at circle (C). For example, the network information service 606 API may be able to provide network telemetry statistical information regarding the saturation of traffic being sent into and/or out of the PSE 300A at its border with the CSP network 302A, indications of actual or scheduled network failures or maintenance, or other quality of service type information, etc. Additionally, or alternatively, the health check service 604 may subscribe to events emitted by the network information service 606 reporting similar information, and also pass this information on to the discovery coordinator service 506 at circle (C).

In some embodiments, the network information service 606 API may only be accessible within the CSP network 302A, which may allow the health check service 604 to access it. However, in some embodiments the discovery coordinator service 506 may be able to directly access the network information service 606 API as shown at circle (B2), and thus it may be able to directly obtain the status information within needing the health check service 604 to do so.

As indicated earlier, at circle (3) during the selection of an endpoint (or set of endpoints) for a particular domain, the discovery coordinator service 506 may now be able to take into account availability or capacity information associated with the endpoints and use this information in addition to the location information detailed above. Thus, for example, if compute instances 312A-312B are experiencing issues (as reflected by non-responsive pings, CSP network 302A congestion, etc.) the discovery coordinator service 506 may be able to instead cause the domain to be resolved to a not-quite-as-close, but more available, application 505C instance 312C by returning its network address 10.0.0.3.

Figure 7:
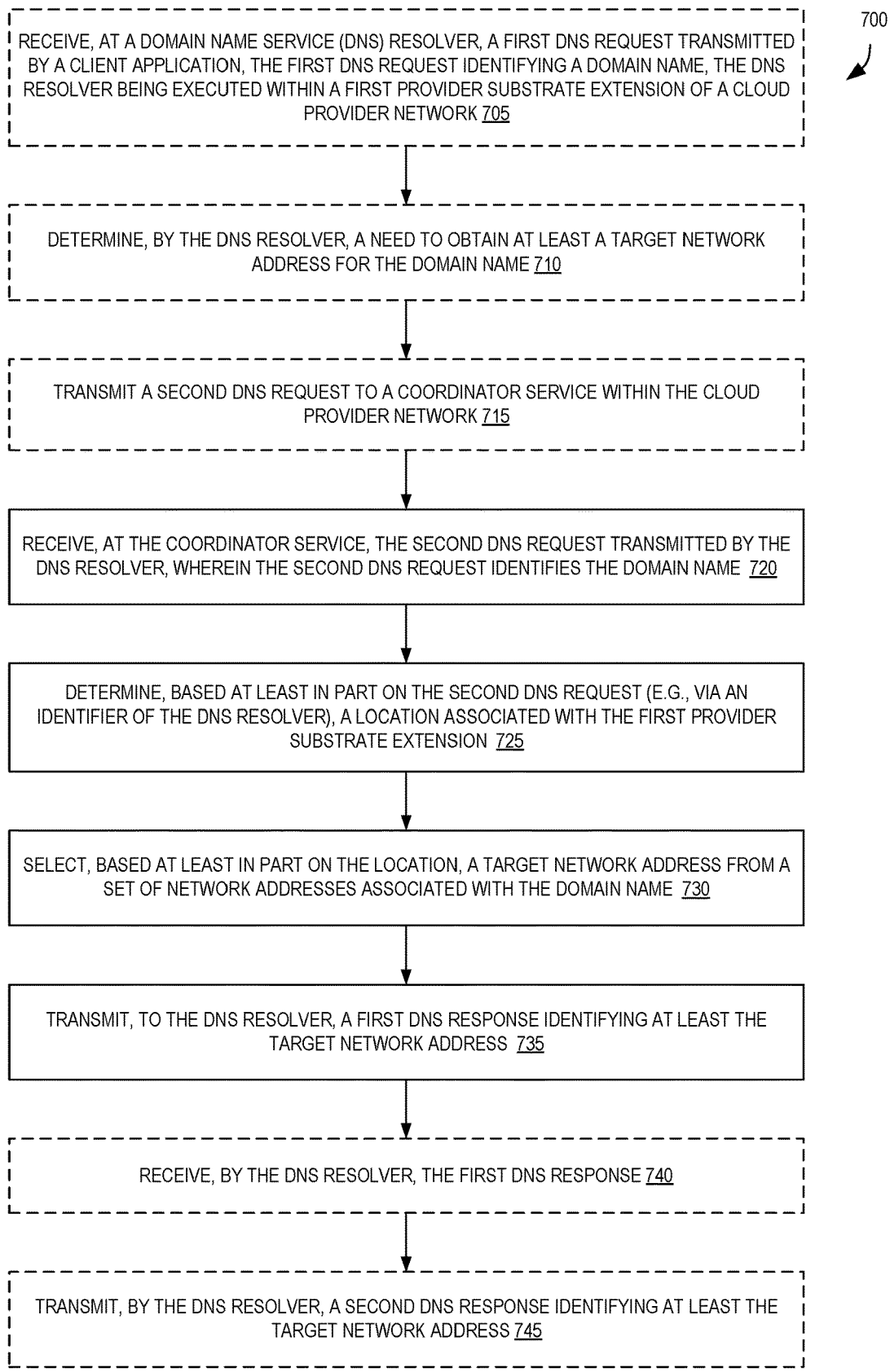
FIG. 7 is a flow diagram illustrating operations of a method for endpoint discovery involving provider substrate extension resources using a DNS-based approach according to some embodiments.

FIG. 7 is a flow diagram illustrating operations of a method for endpoint discovery involving provider substrate extension resources using a DNS-based approach according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more of the operations 700 are performed by the DNS resolver 502A and/or discovery coordinator service 506 of the other figures.

The operations 700 optionally include, at block 705, receiving, at a DNS resolver, a first DNS request transmitted by a client application, the first DNS request identifying a domain name, the DNS resolver being executed within a first provider substrate extension of a cloud provider network. The client application may be executed by a client device outside of the cloud provider network. The first provider substrate extension may be coupled with a telecommunications provider network and may be physically/geographically distinct from components of the cloud provider network itself.

The operations 700 further include, at block 710, determining, by the DNS resolver, a need to obtain at least a target network address for the domain name. Block 710 may include, for example, performing a lookup in a mapping data structure (e.g., resolution cache) using a domain identifier (e.g., a domain name) or derivation thereof (e.g., a hash) and determining that no matching entry exists within the data structure.

At block 715, the operations 700 further include, transmitting a second DNS request to a coordinator service within the cloud provider network, and at block 720, receiving, at the coordinator service, the second DNS request transmitted by the DNS resolver, wherein the second DNS request identifies the domain name.

The operations 700 further include, at block 725, determining, based at least in part on the second DNS request (e.g., via an identifier of the DNS resolver, such as a source network address of the DNS resolver, an identifier of the DNS resolver assigned by the provider network, etc.), a location associated with the first provider substrate extension. Block 725 may include performing a lookup in a mapping data structure that stores associations between computing resources (e.g., network addresses, PSE identifiers, DNS resolver identifiers) and associated location identifiers (e.g., geographic coordinates, area identifiers such as that of a state or city or other defined area).

At block 730, the operations 700 further include, selecting, by the coordinator service based at least in part on the location (e.g., determined in block 725), a target network address from a set of network addresses associated with the domain name. This selecting may include, for example, determining locations associated with each of the set of network addressees, and determining distances between these locations and the determined location from block 725.

In some embodiments, instead of blocks 720-725, the operations 700 may alternatively include performing a lookup in a data structure, using an identifier of the DNS resolver or PSE, to identify one or more other "nearby" PSEs, and using this information to identify network addresses associated with the application that are within these nearby PSEs.

The operations 700 also include, at block 735, transmitting, by the coordinator service to the DNS resolver, a first DNS response identifying at least the target network address, and at block 740, receiving, by the DNS resolver, the first DNS response. Thereafter, at block 745, the operations 700 further include, transmitting, by the DNS resolver, a second DNS response identifying at least the target network address, e.g., back to a requesting client application.

Figure 8:
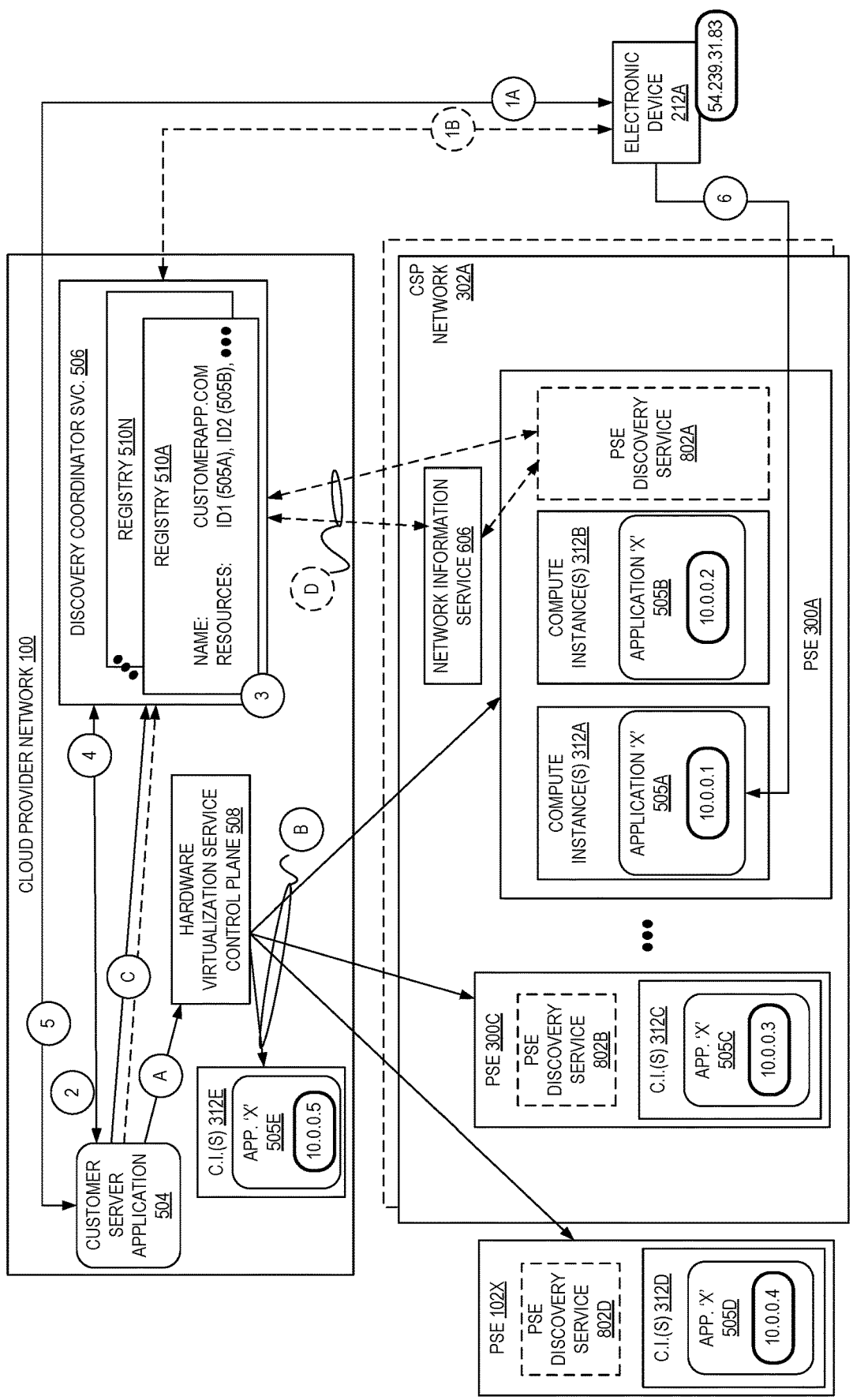
FIG. 8 illustrates an API-based approach for endpoint discovery involving provider substrate extension resources according to some embodiments.

Embodiments may also solve the endpoint discovery issues discussed herein using an API-based approach. To this end, FIG. 8 illustrates an API-based approach for endpoint discovery involving provider substrate extension resources according to some embodiments. In this example, the discovery coordinator service 506 again implements one or more registries 510A-501N that can be used to intelligently identify one or more resources for a client, which may be located in one or more PSEs 300, within a cloud provider network (e.g., cloud provider network 100), etc.

The discovery coordinator service 506 may be accessible across multiple regions of a cloud provider network 100 and may optionally support a cloud development kit (CDK) (e.g., a software framework for defining cloud infrastructure in code) designed to enable the network's customers to more easily manage workloads and match clients to optimal endpoints in potentially massively distributed systems that may span multiple regions of the cloud provider network 100 and/or many different PSEs 300. Accordingly, a client application executed by a client electronic device 212A (e.g., a laptop, mobile phone, augmented reality/virtual reality (AR/VR) device, etc.) with known requirements, such as latency, may be provided—via use of the discovery coordinator service 506—a well-suited, or even optimal, endpoint to connect to from potentially hundreds (or more) of potential endpoints, where each endpoint might only be able to accept a particular number of clients.

Similar to the description with regard to FIG. 5, at circle (A) a customer server application 504 (or another customer application, which may be located outside of the cloud provider network 100) may issue a command to a hardware virtualization service control plane 508 to launch/run one or more compute instances 312 of an application 505 via circle (B) commands, which may include, as an example, two compute instances 312A-312B within a first PSE 300A, a compute instance 312C within a second PSE 300C (of the same CSP network 302A as shown, of a separate CSP network 302N, etc.), a compute instance 312X within a different type of PSE 102X, etc.

The customer server application 504 may publish the existence of these different resources of a particular application 505 to the discovery coordinator service 506 as a registry 510. With a registry, customers of the provider network can define the set of resources which their clients will need access to. Central to this experience is the ability for the customer to define those provider network resources that will function as endpoints for their application across many different locations, e.g., within the provider network itself or within PSEs. By registering a provider network resource, such as a compute instance, gateway, load balancer, database, etc., as an endpoint in such a registry enables that endpoint to become discoverable by clients using an API of the discovery coordinator service 506. In addition to endpoints, a registry in some embodiments may also serve as a grouping mechanism for other remote resources used by a client, such as items in a database table or storage service location/bucket or even an object itself. While a customer may not need to explicitly add these resources to a registry, a customer can associate them to one or more registries, e.g., in some embodiments through the data annotation and access layer. By modeling this set of related resources together in a single registry, customers can make better decisions at runtime on where to route incoming clients and what data they will need local access to.

Accordingly, in some embodiments, at circle (C) the customer server application 504 may send one or more API requests to the discovery coordinator service 506 to create a registry 510A and publish resource information to the registry. For example, as part of circle (C) the customer server application 504 may send a "create registry" API request to first create the registry 510A. One example registry creation API request may be as follows:

create-registry
--registry-name "my_registry"
[--default-max-endpoint-lease-duration-seconds 60]
[--default-max-endpoint-outstanding-lease-count 500]
[--default-endpoint-properties '[{"name": "prop name", "value": "prop value" }]']
[--client-token c29e736d-3b82-474b-a029-22840a6fb4db]

where the "create-registry" method includes a first parameter of a registry name (e.g., an application name), and optionally the customer may also provide default values for certain endpoint attributes such as the maximum lease duration (to be described later herein), a maximum number of outstanding leases count (to be described later herein), and/or other endpoint properties. The request may also include a client-provided token for idempotency purposes.

Circle (C) may also include the customer server application 504 sending one or more additional API requests to populate the created registry, e.g., using a "register endpoint" API request that associates a resource (e.g., a compute instance) with the registry. One example register endpoint API request may be as follows:

register-endpoint
--registry-id us:123456789:registry/123abc/my_registry
--resource-id hvs:us123456789:instance/i-123456
[--max-lease-duration-seconds 120]
[--max-outstanding-lease-count 100]
[--properties '[{"name": "prop name", "value": "override value"}]']
[--client-token c29e736d-3b82-474b-a029-22840a6fb4db]

where the "register-endpoint" method includes a first "registry-id" parameter identifying a name of the registry and a second "resource-id" parameter identifying the resource (e.g., a compute instance) to be associated with the registry, here a unique instance identifier (from the perspective of the provider network or within the customer's account) of "i-123456". Optionally, the customer may also provide default values for certain attributes such as a maximum the maximum lease duration (to be described later herein), a maximum number of outstanding leases count (to be described later herein), and/or other resource properties. The request may also include a client-provided token for idempotency purposes.

In some embodiments, at circle (C), the customer server application 504 may issue a first create-registry API request to create a registry 510A, and then issue a register-endpoint API request for each compute instance sought to be associated with the registry 510A, e.g., one call for each of compute instances 312A, 312B, 312C, 312D, 312E.

As a result, the registry 510A is created and populated with resource associations, here depicted as having a registry name of "customerapp.com" and including identifiers of provider network-associated resources "ID1" (corresponding to compute instance 312A), "ID2" (corresponding to compute instance 312B), and the like.

In some embodiments, the discovery coordinator service 506 may obtain instance performance and/or network characteristic data as shown via optional circle (D), where the discovery coordinator service 506 may directly query a network information service 606 of a CSP network 302A and/or receive this network information via a PSE discovery service 802A in the PSE 300A and perhaps also compute instance health status information (e.g., resulting from periodic ping testing) also from the PSE discovery service 802A.

Thereafter, a user's electronic device 212A may seek to connect to a customer's application which here is implemented via compute instances in many different locations, including within one or more PSEs 300A-300C coupled to one or more telecommunications provider networks 302A-302N. The electronic device 212A may identify a "best" one of these resources via direct or indirect use of the discovery coordinator service 506.

For example, in some embodiments, an indirect technique may be implemented by a customer (for its clients) as shown by circle (1A), where a client application of the electronic device 212A sends a message to a "backend" customer server application 504, which may provide to the customer server application 504 one or more location values associated with the electronic device 212A, e.g., its network address (IP address), its GPS coordinates, etc.

At circle (2), the customer server application 504 may then interact with the discovery coordinator service 506 to identify one or multiple endpoints for the client application to utilize to connect to the application. In a scenario in which the customer server application 504 obtains multiple such options, the customer server application 504 may optionally use its own selection logic to select one endpoint for the client.

For example, as part of circle (2), the customer server application 504 may send a "discover endpoints" API request to the discovery coordinator service 506, including the one or more location values and an identifier of the registry (e.g., an identifier of the application sought to be connected to by the electronic device 212A), which the discovery coordinator service 506 can use to identify one or more low-latency endpoints. One example discover endpoints API request may be implemented as follows:

discover-endpoints
--registry-id us:123456789:registry/123abc/my_registry
[--client-location-details '[{"ipAddress": "54.239.31.83", "latitude": 53.2734, "longitude": -7.77832031}]']
[--endpoint-properties '[{"name": "prop name", "value": "prop value"}]']
[--discovery-strategy 'CLIENT_LATENCY'|'LOAD'|'LATENCY_AND_LOAD']
[--page-token]
[--max-results]

Using this provided information, at circle (3), the discovery coordinator service 506 may identify the associated registry 510A corresponding to the identified registry/application within the request. The discovery coordinator service 506 may then use the location values, e.g., an IP address of the client, a latitude and longitude of the client, etc., to determine which endpoints will likely provide a minimum latency for the client based on analyzing distances between the client application of the electronic device 212A and the resources corresponding to the resource identifiers in the registry 510A. In some embodiments, the returned set of one or more endpoints (where the number may be set by the request via the "max-results" parameter) may be provided in an ordered list. For example, when using a discovery strategy based on estimated client latency, the list may begin with an endpoint with the lowest estimated latency, and then be followed by the next nearest endpoint, and so on.

However, in some scenarios the discovery coordinator service 506 may identify endpoints based on other criteria, e.g., one identified with the "discovery-strategy" parameter of the request, which may be based on client latency as described above, on an estimated load of each instance basis, based on both load and latency (e.g., in which an estimated latency value and an estimated load value may be combined in some manner to result in a value that can be compared), etc. Techniques for partial or complete load-based discovery will be presented below, e.g., with regard to FIG. 9.

In some embodiments, by default the list is prioritized in terms of latency to the clients and load, with lower latency and less loaded endpoints appearing earlier in the list. In some embodiments, multiple clients' location values may be provided in a single request, in which the discovery coordinator service 506 may evaluate endpoint latency such that endpoints which collectively deliver the lowest latency across all clients will be prioritized. The originator of the API request (e.g., the customer server application 504 or the electronic device 212A, as detailed below) may also specify endpoint properties as part of the discovery strategy, causing the discovery coordinator service 506 to consider only endpoints for inclusion in the result set if they have been annotated with matching properties.

In some embodiments, the identified one or more endpoints may be returned in response to the discover-endpoints API request at circle (4), which may be in a format as follows:
{endpoints: [
  {
    endpoint-ID: us:123456789:endpoint/abc123,
    registry-id us:123456789:registry/123abc/my_registry,
    resource-id hvs:us:123456789:instance/i-123456
    dnsName: null,
    ipAddress: null,
    ipV6Address: 2001:db8:85a3:0:0:8a2e:333:3333,
    maxLeaseDurationSeconds: 300,
    maxOutstandingLeaseCount: 500,
    currentOutstandingLeaseCount: 200,
    healthCheckStatus: HEALTHY,
    location: {
      locationName: us-west-2-PSE-1,
      locationType: PSE
    }
  },
  . . .
]}
where one or more endpoint blocks are returned, each of which may identify an identifier of the endpoint (e.g., a unique identifier within the context of the provider network), an identifier of the registry, an identifier of the application (e.g., "resource-id"), a DNS name of the resource, a IP v4 and/or v6 address of the compute instance, lease information, a health check status (e.g., "healthy" if the compute instance has successfully responded to a defined number of pings within a recent period of time), a representation of the resources location (e.g., an AZ name and/or location type (e.g., PSE meaning provider substrate extension)), etc.

With this information, the customer server application 504 may identify one endpoint according to its own custom logic (e.g., select the first endpoint) and return it, at circle (5), to the client application executed by the electronic device 212A. In other embodiments, though, the customer server application 504 may return multiple or all returned endpoints to the client application.

Thereafter, the client application of the electronic device 212A may utilize (e.g., communicate with) an optimal endpoint at circle (6), e.g., a compute instance 312A hosting the desired application 505A, in this case located within a PSE 300A.

In additional to accessing the discovery coordinator service 506 indirectly via the customer server application 504, in some embodiments the electronic device 212A may also directly identify optimal endpoints at circle (1B), e.g., by itself interacting with the discovery coordinator service 506 in a similar manner as the customer server application 504 does as described above, e.g., by sending discover endpoints requests, receiving responses thereto, and utilizing logic to identify a preferred endpoint.

In some embodiments, multiple discovery coordinator service 506 instances may be deployed in a cooperative manner to implement a distributed discovery coordinator service, e.g., across multiple regions of a cloud provider network. In some embodiments, a discovery coordinator service 506 instance may be deployed in each region (or, in multiple regions) of a cloud provider network 100. In such cases, each discovery coordinator service 506 instance may be adapted to take "ownership" of information for computing resources (e.g., instances 312, endpoints, etc.) associated with that region (or a set of regions). Each discovery coordinator service 506 instance may be responsible for tracking the health and presence of all of these instances/resources that are "mastered" to that instance (or region), and propagate updated information to other discovery coordinator service 506 instances of the other regions of the cloud provider network 100, e.g., via sending status update messages with status update values (e.g., indicating a new mapping, an availability or unavailability of an instance, a load of an instance, etc.). Thus, each discovery coordinator service 506 instance will manage its own set of resources and send out updates regarding those resources while receiving updates from other discovery coordinator service 506 instances with updates regarding those resources that they manage Beneficially, this configuration can allow for updates to propagate occur across a large cloud provider network extremely quickly (e.g., in seconds or fractions thereof), especially when compared to existing traditional DNS-based propagation techniques that require significant amounts of time for propagation updates, which can require minutes, hours, or even tens of hours.

Figure 9:
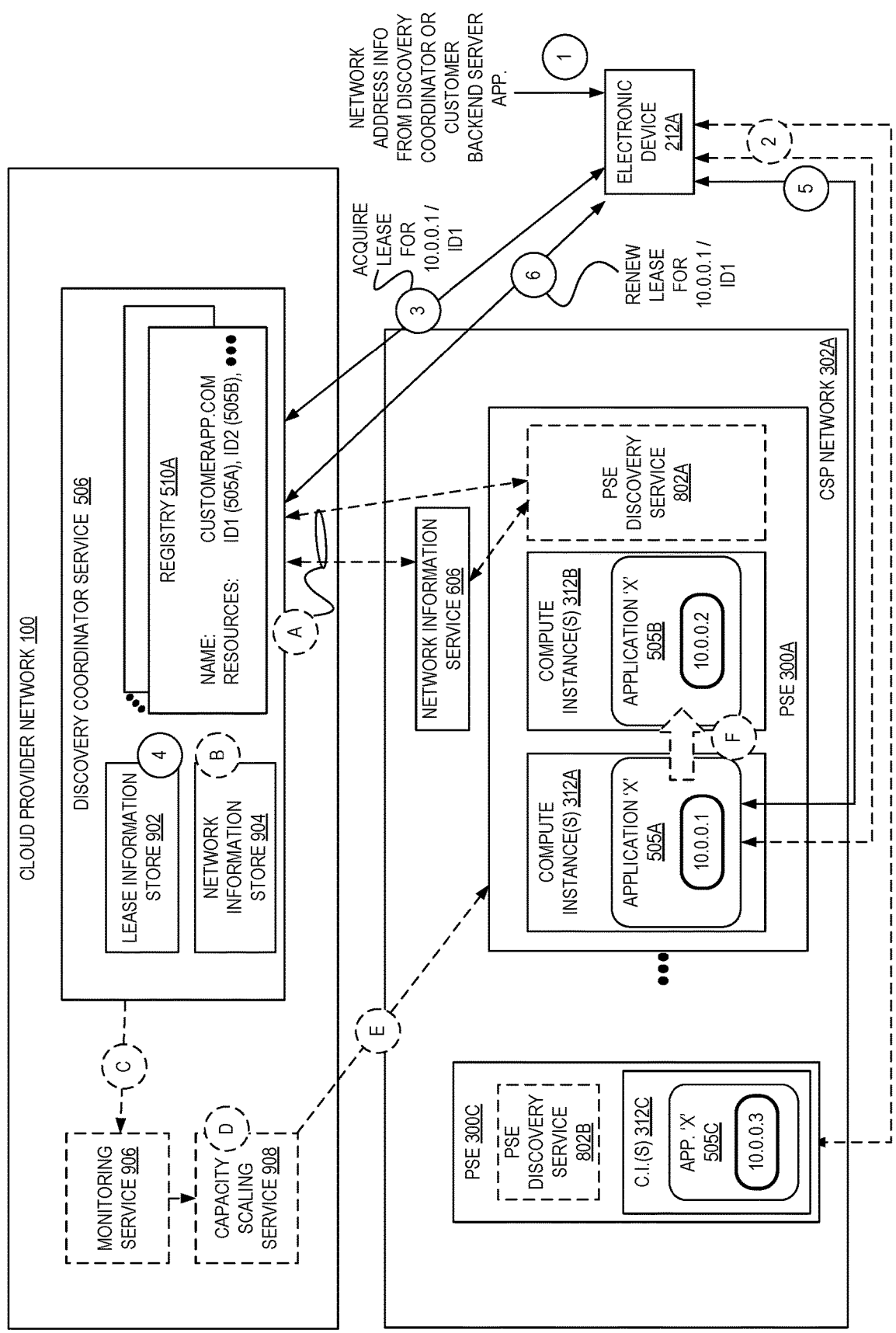
FIG. 9 illustrates lease-based techniques and autoscaling techniques under an API-based approach for endpoint discovery involving provider substrate extension resources according to some embodiments.

As indicated above, the selection of an optimal endpoint may involve latency/distance-based analysis, though in some embodiments the selection may also be based at least in part on a load of the resources. FIG. 9 illustrates lease-based techniques and autoscaling techniques under an API-based approach for endpoint discovery involving provider substrate extension resources according to some embodiments. In this example, we assume a similar configuration and network address information discovery technique as presented with regard to FIG. 8, which may include obtaining network status and/or compute instance health information as described with regard to illustrated circle (A), which can be stored in a network information store 904 at circle (B). Moving forward, at circle (1), the electronic device 212A obtains endpoint network address information of one (or more) endpoints from the discovery coordinator service 506 or customer server application 504 in a manner similar to described above.

When the client application of the electronic device 212A receives a single endpoint, that endpoint will be utilized by the client. However, in some embodiments, the client application of the electronic device 212A may receive multiple endpoints corresponding to multiple compute instances of the application—in this case, located in a nearby PSE 300A or PSE 300N—and may perform a client-side technique for selecting one of the endpoints for use. For example, in some embodiments the electronic device 212A may simply select one of the endpoints (e.g., a first one, such as when the results are presented via an ordered list) and utilize it, utilize different ones (e.g., in a random or round-robin approach) for different interactions, etc. As another example, the client itself may "test" these instances by, at optional circle (2), pinging, performing a network trace, or opening connections to multiple instances, allowing the electronic device 212A to determine which instances are the closest, respond the quickest, etc., and then select a best-performing instance. In some embodiments, data based on these tests (e.g., ping latencies, network hop counts, etc.) may be sent by the client back to the discovery coordinator service 506, which may further inform its decision-making for subsequent requests or cause a remapping to occur.

When an instance has been selected, at circle (3) the electronic device 212A may be configured to acquire a lease, via the discovery coordinator service 506, for using that endpoint. In this example scenario, the electronic device 212A has selected compute instance 312A (having a resource identifier of "ID1" and a network address of 10.0.0.1) that resides in a nearby PSE 300A attached to a CSP network 302A, which may result for example when the electronic device 212A utilizes that telecommunications provider for cellular-based network access connectivity. An example of an acquire-endpoint-lease API request may be implemented as follows:

acquire-endpoint-lease
--endpoint-ID: us:123456789:endpoint/ID1
[--duration-seconds 60]
[--client-token c29e736d-3b82-474b-a029-22840a6fb4db]

In some embodiments, the duration of the lease can either be the default value for that endpoint (set at the registry or endpoint level as previously discussed with regard to those API requests) or a value less than or equal to the maximum duration, which may be set in terms of seconds (duration-seconds) or milliseconds (duration-millis) in various embodiments. In the event that the lease is requested for longer than the maximum duration or the endpoint has already reached its maximum number of allowed leases, an error may be returned. The total number of outstanding leases against an endpoint can be found by describing the endpoint. The request may also include a client-provided token for idempotency purposes. Upon the completion of the acquire-endpoint-lease API request an identifier may be returned for the lease (e.g., as "lease-ID" or "endpoint-lease-ID"), which can be used in subsequent API calls to renew or revoke the lease. In some embodiments, if it is determined that another lease may be granted for the resource, a record identifying this lease is inserted into a lease information 902 at circle (4) and a 'success' response is sent back to the electronic device 212A with a lease identifier corresponding to the record. With an active lease, at circle (5) the electronic device 212A can utilize the application 505A implemented by the compute instance 312A for up to the lease amount of time, and may thereafter renew the lease if further use of the compute instance 312A is needed.

In some embodiments, the acquisition of the lease may not be a strict technical requirement to utilizing a compute instance, and thus no technical safeguard may be in place to require such an acquisition. However, if a customer develops its clients to follow the lease acquisition process, the customer can be provided significantly improved endpoint discovery, via load balancing and/or autoscaling of capacity, as described herein.

In addition to the dedicated acquire-endpoint-lease API described above, in some embodiments clients can also utilize the discover-endpoints API to combine the discovery and lease steps by passing in an "acquire-leases" flag as shown below. As a result, the API may return a list of lease data as an additional property of the discover endpoints response. These leases may be configured with the registry specified default duration unless an override duration is provided via the lease-duration-seconds parameter. An example of one such discover-endpoints API request is as follows:

discover-endpoints
--registry-id us:123456789:registry/123abc/my_registry
[--client-location-details '[{"ipAddress": "54.239.31.83", "latitude": 53.2734, "longitude": -7.77832031}]']
[--endpoint-properties '[{"name": "prop name", "value": "prop value"}]']
[--discovery-strategy 'CLIENT_LATENCY']
[--lease-duration-seconds 10]
[--acquire-leases]
[--page-token]
[--max-results]

Using a valid lease identifier obtained from the initial acquire-endpoint-lease API, clients can renew the lease, at circle (6), against the same endpoint for an amount of time equal or less than the maximum lease duration allowed by the endpoint. If the lease has expired or has been revoked an error may be returned. An example of one such renew-endpoint-lease API request is as follows:

renew-endpoint-lease
--endpoint-lease-id us:123456789:lease/123abc
[--duration-seconds 60]
[--client-token c29e736d-3b82-474b-a029-22840a6fb4db]

Similar API requests may be implemented for other lease maintenance aspects, e.g., eliminating leases via a request to revoke endpoint leases, decreasing traffic to an endpoint via a request to update the endpoint with smaller lease durations and/or maximum numbers of leases allowed.

Via a lease-based access system, numerous benefits may result. One primary benefit is that the discovery coordinator service 506 has the ability to select endpoints based on the current loads being placed on the customer resources via examining the numbers of current leases and/or the configured maximum lease count as proxies for load. Thus, the discovery coordinator service 506 may potentially purposefully select an endpoint to be returned (or placed highly in an ordered list of discovered endpoints) that is not strictly the nearest resource to the client, such as when that resource is sufficiently loaded (e.g., has more than some threshold percentage (or number) of leases being used, such as 50%, 75%, 90%, 95%, 99%) and another resource is available with a lighter load. In this manner, customers may select the discovery strategy that suits their needs—whether it be purely based on client latency (and thus, a "closest" resource is returned first), purely based on load (and thus, a "least busy" resource is returned first), or a combination thereof (where a "close" and relatively unloaded resource is returned first).

Under such an approach that is at least partially based on capacity/load, the discovery coordinator service 506 is thus able to perform centralized load balancing of resources without needing to necessarily rely on load balancing components within the PSEs 300 or other locations, which may be relatively resource constrained.

In some embodiments, the tracking of lease-based information and/or network or instance status information can also enable intelligent load-based scaling of resources. For example, in some embodiments, various events of the discovery coordinator service 506—such as a particular API request or response being received or emitted, a lease-based error being emitted, a maximum number of leases (or a lease threshold) being met—can be "published" to a monitoring service 906 at circle (C). A monitoring service 906 may provide a monitoring and observability service, e.g., built for DevOps engineers, developers, site reliability engineers (SREs), information technology managers, computer services (such as a capacity scaling service 908 of the provider network 100), etc., by monitoring logs, metrics, events, and providing users and applications with data and actionable insights to enable application monitoring, system-wide performance change response, resource utilization optimization, etc. In some embodiments, the monitoring service 906 can itself generate alarms or trigger actions based on the detection of anomalies with monitored data, configured rules being met, etc.

A capacity scaling service 908, at circle (D), may watch for certain events or conditions pertaining to these resources and modify the capacity of the application in response. For example, the capacity scaling service 908 may be configured to watch for any events where a threshold number of leases are being actively utilized, and follow the dictates of an autoscaling policy to, e.g., launch additional compute instances 312 for the application at one or more locations (e.g., PSEs), terminate compute instances 312 for the application at one or more locations, etc. Thus, in this example if only application 505A and 505C were initially deployed and the capacity scaling service 908, via the monitoring service 906, detects that a threshold number of active leases for the computer instance 312A is satisfied, at circle (E) the capacity scaling service 908 may determine that a rule/condition is satisfied (defining the threshold to be met, and a responsive action) and automatically launch (or terminate) an additional compute instance 312B for the application 505 on behalf of the customer by sending the necessary control plane commands to the PSE 300A.

FIG. 10 is a flow diagram illustrating operations 10 of a method for endpoint discovery involving provider substrate extension resources using an API-based approach according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the discovery coordinator service 506 of the other figures.

The operations 1000 include, at block 1005, receiving, at a coordinator service within a cloud provider network, a first API request to discover one or more endpoints associated with an application, the first API request including an identifier of the application (e.g., a provider network resource identifier, a domain name, etc.) and one or more location values associated with a client device seeking to interact with the application. The first API request may be originated by a server application executing within the provider network (block 1010) or originated by the client device outside the provider network (block 1015). The one or more location values may include a network address (e.g., an IPv4 or IPv6 address) associated with the client device (block 1020) and/or a geographic coordinate value (e.g., a latitude and longitude) associated with the client device (e.g., generated by the GPS unit of the device).

At block 1030, the operations 1000 further include selecting, by the coordinator service based at least in part on the application identifier and the one or more location values, one or more endpoints that are associated with the application, wherein at least one of the endpoints is associated with a compute instance executed within a provider substrate extension of the cloud provider network. Block 1030 may include, at block 1035, determining a location of the client device based on the one or more location values, identify endpoints associated with the application at block 1040, and/or selecting one or more endpoints based on an estimated latency between the endpoints and the client device at block 1045.

The operations 1000 further include, at block 1050, transmitting, by the coordinator service, a response message that identifies the one or more endpoints. The response message may include a network address utilized by the compute instance, and the response message may be transmitted to the server application or to the client device.

FIG. 11 is a flow diagram illustrating operations 1100 of a method for endpoint discovery with remote load balancing involving provider substrate extension resources using an API-based approach according to some embodiments.

Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1100 are performed by the discovery coordinator service 506 of the other figures.

The operations 1100 include block 1005 from FIG. 10 and, at block 1105, selecting, based at least in part on the application identifier and a load value of each of a plurality of compute instances, one or more endpoints from a plurality of endpoints that are associated with the application, wherein at least a first of the plurality of endpoints is associated with a first compute instance of the plurality of compute instances that is executed within a first provider substrate extension of the provider network. In some embodiments, block 1105 includes block 1040 (of FIG. 10) and identifying a plurality of endpoints associated with the application, e.g., by performing a lookup in a registry using the application identifier. In some embodiments, block 1105 includes block 1110 and determining, for each of a plurality of compute instances associated with the plurality of endpoints, a number of active leases obtained for the compute instance, wherein the load value of each compute instance comprises the number of active leases or is based at least in part on the number of active leases (e.g., is an average or moving average over a recent period of time of the number of active leases). In some embodiments, block 1105 includes block 1115 and selecting one or more endpoints based at least in part the numbers of active leases associated with the endpoints, e.g., by selecting a top 'n' (e.g., 1, 3, 5) number of endpoints having the smallest number of active leases, smallest percentage of the maximum allowable leases being actively utilized, etc. In some embodiments, the selection is also based on determined estimated distances between the client device and the endpoints, e.g., based on determining a location of the client (via a network address and/or GPS coordinate)

The operations 1100 further include, at block 1050, transmitting, by the coordinator service, a response message that identifies the one or more endpoints. The response message may include one or more network addresses utilized by the one or more compute instances, and the response message may be transmitted to the server application or to the client device.

Figure 12:
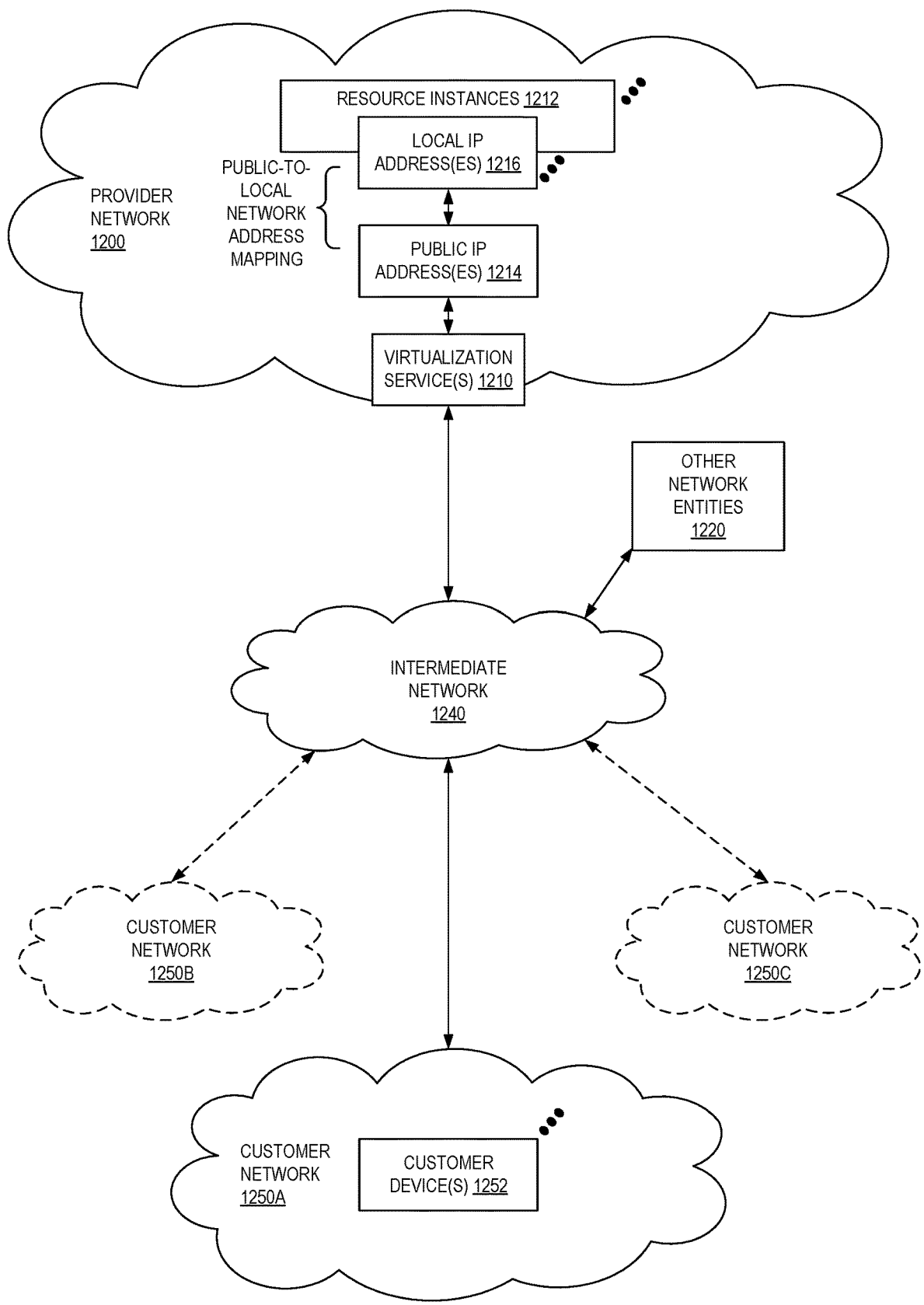
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
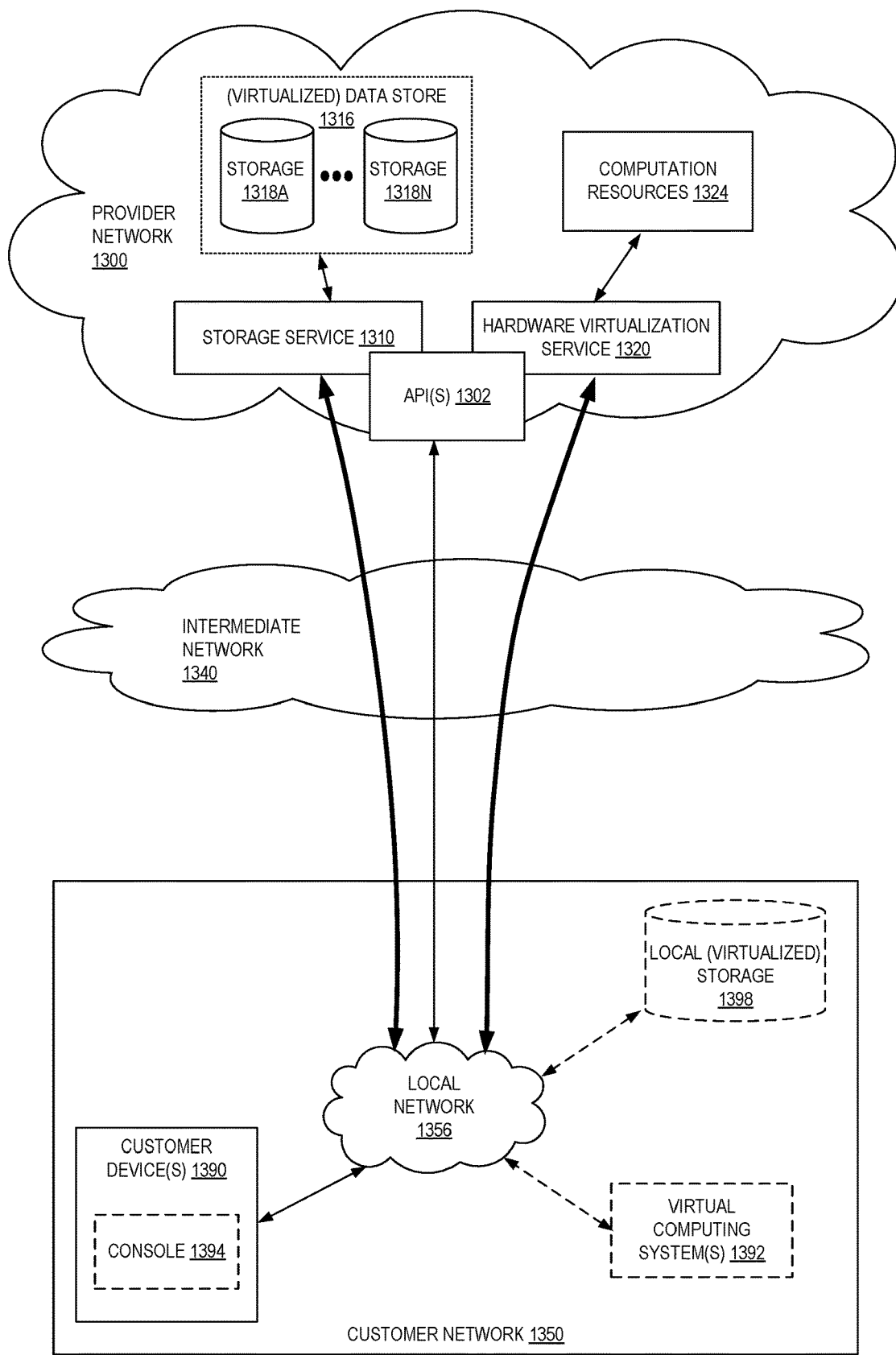
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative Systems

Figure 14:
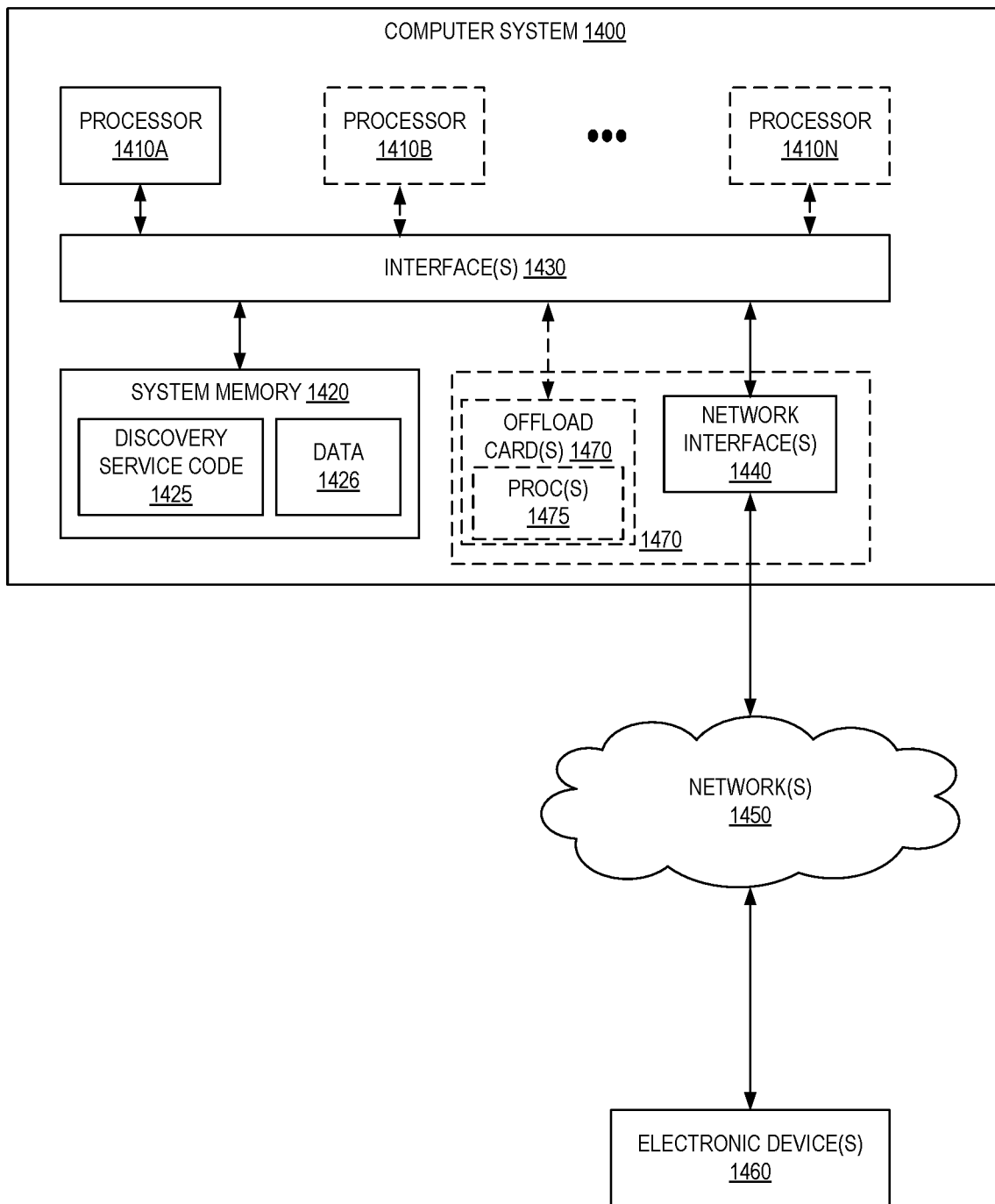
FIG. 14 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as discovery service code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a coordinator service within a cloud provider network, one or more application programming interface (API) requests to register a plurality of endpoints with a registry for an application;
   receiving, at the coordinator service, a first API request to discover endpoints associated with the application, the first API request including an identifier of the registry and one or more location values associated with a client device seeking to interact with the application, the one or more location values include at least one of a network address of the client device or a geographic coordinate of a location of the client device;
   selecting, by the coordinator service based at least in part on the registry identifier and the one or more location values, one or more endpoints from the plurality of endpoints, wherein at least one of the endpoints is associated with a compute instance executed within a provider substrate extension of the cloud provider network, wherein the provider substrate extension is connected to a communications service provider network and is separate from the cloud provider network; and
   transmitting, by the coordinator service, a response message that identifies the one or more endpoints.

2. The computer-implemented method of claim 1, wherein the selecting of the one or more endpoints includes determining, based on the one or more location values, an estimated network latency between the client device and the compute instance.

3. The computer-implemented method of claim 1, wherein the first API request was originated by a server application executed within the cloud provider network, wherein the client device is a mobile device located outside of the cloud provider network that is communicatively coupled with the communications service provider network.

4. A computer-implemented method comprising:
   receiving, at a coordinator service within a cloud provider network, a first application programming interface (API) request to discover one or more endpoints associated with an application, the first API request including an identifier of the application and one or more location values associated with a client device seeking to interact with the application;
   selecting, by the coordinator service based at least in part on the application identifier and the one or more location values, one or more endpoints that are associated with the application, wherein at least one of the endpoints is associated with a compute instance executed within a provider substrate extension of the cloud provider network; and
   transmitting, by the coordinator service, a response message that identifies the one or more endpoints.

5. The computer-implemented method of claim 4, wherein the one or more location values include at least one of:
   a geographic coordinate of the client device; or
   a network address of the client device.

6. The computer-implemented method of claim 4, wherein receiving of the first API request occurs at a first coordinator service instance within a first region of the cloud provider network, the method further comprising:
   receiving, by the first coordinator service instance prior to receiving the first API request, a status update value associated with the compute instance; and
   sending, by the first coordinator service instance to a plurality of other coordinator service instances in a corresponding plurality of other regions of the cloud provider network, an update message based on or including the status update value.

7. The computer-implemented method of claim 4, further comprising:
   receiving, at the coordinator service, a second API request to create a registry associated with the application, the second API request including at least one of:
   an identifier of a lease duration, or
   a maximum number of concurrent active leases for endpoints associated with the registry.

8. The computer-implemented method of claim 7, further comprising:
receiving, at the coordinator service, one or more API requests to register the one or more endpoints, wherein each of the one or more API requests includes:
an identifier of the registry, and
a network address or identifier of the corresponding endpoint.

9. The computer-implemented method of claim 8, further comprising:
receiving, at the coordinator service, a third API request to acquire a lease, the third API request including the identifier of the registry; and
transmitting, by the coordinator service, an API response including a lease identifier.

10. The computer-implemented method of claim 9, further comprising:
receiving, at the coordinator service, a fourth API request to renew the lease, the fourth API request including the lease identifier; and
transmitting, by the coordinator service, an API response.

11. The computer-implemented method of claim 4, wherein the first API request was originated by a server application executed within the cloud provider network, and wherein the client device is outside of the cloud provider network.

12. The computer-implemented method of claim 4, wherein:
the first API request was originated by the client device;
the client device sent the first API request via a cellular communications link via a communications service provider network; and
the provider substrate extension is connected to the communications service provider network and is separate from the cloud provider network.

13. The computer-implemented method of claim 4, wherein selecting the one or more endpoints includes:
determining, based on the one or more location values associated with the client device, an estimated network latency between the client device and a plurality of compute instances corresponding to a plurality of endpoints,
wherein the selected one or more endpoints includes the endpoint corresponding to the compute instance having a smallest estimated network latency.

14. The computer-implemented method of claim 4, wherein selecting the one or more endpoints includes:
determining, a number of active leases associated with each of a plurality of endpoints associated with the application,
wherein the selecting is further based on an analysis of the number of active leases associated with ones of the plurality of endpoints.

15. A system comprising:
a provider substrate extension implemented by a first one or more electronic devices, wherein the provider substrate extension includes a computer system that provides capacity for execution of compute instances for users of a provider network and is controlled at least in part by a control plane of the provider network, wherein the provider substrate extension is coupled with a communications service provider network that is separate from the provider network; and
a coordinator service implemented by a second one or more electronic devices within the provider network, the coordinator service including instructions that upon execution cause the coordinator service to:
receive a first application programming interface (API) request to discover one or more endpoints associated with an application, the first API request including an identifier of the application and one or more location values associated with a client device seeking to interact with the application;
select, based at least in part on the application identifier and the one or more location values, one or more endpoints that are associated with the application, wherein at least one of the endpoints is associated with a compute instance executed within the provider substrate extension; and
transmit a response message that identifies the one or more endpoints.

16. The system of claim 15, wherein the one or more location values include at least one of:
a geographic coordinate of the client device; or
a network address of the client device.

17. The system of claim 15, wherein the instructions upon execution further cause the coordinator service to:
receive a second API request to create a registry associated with the application, the second API request including at least one of:
an identifier of a lease duration, or
a maximum number of concurrent active leases for endpoints associated with the registry; and
create or update a registry data structure based on the second API request.

18. The system of claim 17, wherein the instructions upon execution further cause the coordinator service to:
receive one or more API requests to register the one or more endpoints, wherein each of the one or more API requests includes:
an identifier of the registry, and
a network address or identifier of the corresponding endpoint; and
update the registry data structure based on the one or more API requests.

19. The system of claim 18, wherein the instructions upon execution further cause the coordinator service to:
receive a third API request to acquire a lease, the third API request including the identifier of the registry; and
transmit, by the coordinator service, an API response including a lease identifier.

20. The system of claim 19, wherein the instructions upon execution further cause the coordinator service to:
receive a fourth API request to renew the lease, the fourth API request including the lease identifier; and
transmit, by the coordinator service, an API response.

* * * * *